United States Patent [19]

Nagano

[11] Patent Number: 4,612,004

[45] Date of Patent: Sep. 16, 1986

[54] REAR DERAILLEUR FOR A BICYCLE

[75] Inventor: Masashi Nagano, Izumi, Japan

[73] Assignee: Shimano Industrial Company Limited, Osaka, Japan

[21] Appl. No.: 636,013

[22] Filed: Jul. 30, 1984

[30] Foreign Application Priority Data

Aug. 2, 1983 [JP] Japan .......................... 58-121081[U]
Aug. 4, 1983 [JP] Japan .......................... 58-121985[U]
Aug. 4, 1983 [JP] Japan .......................... 58-121986[U]

[51] Int. Cl.[4] .............................................. F16H 7/18
[52] U.S. Cl. ...................................... 474/80; 474/144
[58] Field of Search ................................ 474/78-83, 474/144, 140

[56] References Cited

U.S. PATENT DOCUMENTS 3,184,993  5/1965  Swenson .......................... 474/144

FOREIGN PATENT DOCUMENTS 974676  2/1951  France ............................... 474/80

Primary Examiner—Stephen J. Novosad
Assistant Examiner—Thuy M. Bui
Attorney, Agent, or Firm—Stevens, Davis, Miller & Mosher

[57] ABSTRACT

A rear derailleur for a bicycle is provided with a chain guide having a guide pulley, a tension pulley and pulley plates carrying both of the pulleys, for switching a driving chain to any desired particular sprocket of a multistage sprocket assembly for changing the bicycle speed. A holder is provided at the pulley plate positioned closest to the multistage sprocket assembly and is positioned outside the path of movement of the chain travelling from the tension pulley to the guide pulley. When the chain is driven in reverse from the multistage sprocket assembly to the guide pulley, the holder holds the chain along the aforementioned path, whereas the chain would otherwise be caused to leave the path.

6 Claims, 10 Drawing Figures

REAR DERAILLEUR FOR A BICYCLE

FIELD OF THE INVENTION

This invention relates to a rear derailleur for a bicycle, and more particularly to a rear derailleur which is provided with a chain guide comprising a guide pulley, a tension pulley and pulley plates for supporting the pulleys and which is used to switch them and switch a driving chain to any desired particular sprocket of a multistage sprocket assembly of the bicycle for changing the speed thereof.

BACKGROUND OF THE INVENTION

Generally, this kind of derailleur includes a derailleur body mainly comprising a linkage mechanism of a support member, a pair of linkage members, and a movable member, and a chain guide pivoted to the movable member. The derailleur is disposed axially outwardly of the minimum tooth number high speed sprocket at a multistage sprocket assembly mounted through the support member to the bicycle frame supporting a rear wheel. The chain is stretched across a front gear at a crank means and one of the multistage sprockets engages with the tension pulley and guide pulley. The movable member is shifted by a control wire toward the maximum tooth number low speed sprocket against a return spring at the derailleur body and by a restoring force of the return spring toward the minimum tooth number high speed sprocket, so that the chain is adapted to be switched to any desired particular sprocket.

This kind of derailleur is provided with an energy conservation mechanism to enable a preparatory speed-change operation by an operating lever even when the chain is not driven by pedalling, and then the chain, when driven by the pedalling, can be switched to the preset speed-change stage by the lever.

The normal pedalling for forward movement of the bicycle enables smooth switching of the chain, but in a case where the control wire is operated to preshift the chain guide from the low speed sprocket to the high speed sprocket, especially when the chain engages with the maximum tooth number low speed sprocket, the chain guide, which usually is biased by the return spring toward the minumum tooth number high speed sprocket, becomes shifted thereto to a maximum and the chain is inclined between the maximum tooth number low speed sprocket and the guide pulley.

Accordingly, under this condition, when the bicycle wheel is rotated in reverse and the multistage sprocket assembly rotates in reverse, the chain, while engaging with the maximum tooth number low speed sprocket, is driven therefrom toward the guide pulley. As a result, the chain is intended to be slack such that it curves outwardly from the guide pulley rather than engaging therewith. Then, the chain is largely slack and leaves the chain guide. The chain also loses it holding force for holding the chain guide at the position corresponding approximately to the maximum tooth number low speed sprocket, whereby the chain guide is shifted by the return spring to the position corresponding to the minimum tooth number high speed sprocket.

Thus, the chain curves outwardly from the guide pulley and this leads to shifting of the chain from the path of proper movement of the chain.

Hence, in this condition, when the multistage sprocket assembly normally rotates by normal rotation of the wheel or by normal pedalling, the chain, which curves outwardly and comes out from the proper chain line between both the pulleys, is pulled by the maximum tooth number low speed sprocket, at which time the chain happens to fall between the maximum tooth number low speed sprocket and the pulley plate at the multistage sprocket assembly side, thereby creating a problem in that the rear derailleur and other parts there around may be broken.

On the contrary, in a case where the control wire is pulled when the chain engages with the high speed sprocket and the chain guide is preshifted from the high speed sprocket side to the low speed sprocket side, when the bicycle is moved rearwardly to rotate the sprocket assembly in reverse, the chain is raised in the direction of disengaging from the guide pulley, thereby creating a problem in that the chain may fall down similarly to the above.

On the other hand, in a case where the multistage sprocket assembly is rotated in a reverse direction by reverse pedalling other than the backward movement of the bicycle, the chain carried between the multistage sprocket assembly and a front chain gear travels at the upper side or slack side toward the rear sprocket and is driven at the lower side or tight side from the tension pulley toward the front chain gear. As a result, the chain guide is put in condition of turning forwardly upwardly at the tension pulley side.

For example, in the state where the chain engages with the low speed sprocket, the chain guide, when preshifted toward the high speed sprocket side, is positioned slantwise between the low speed sprocket and the guide pulley. Under such condition, the reverse pedalling causes the chain to leave the guide pulley and be locked between the low speed sprocket and the pulley plate so that if the reverse pedalling continues in this condition, the derailleur leads to a breakdown.

SUMMARY OF THE INVENTION

A main object of the invention is to provide a rear derailleur for a bicycle, which ensures that the chain, which is driven from the multistage sprocket assembly to the guide pulley at the chain guide by reverse rotation of the bicycle wheel, is prevented from being slack to curve outwardly from the guide pulley to such an extent as to disengage therefrom.

Another object of the invention is to provide a rear derailleur for a bicycle, which enables the chain to be driven in reverse without escaping from the pulley plate at the chain guide even when the pedals are operated in reverse or the bicycle is backwardly moved.

Still another object of the invention is to provide a rear derailleur for a bicycle, which enables the chain to be driven smoothly without being locked to the pulley plate even when the chain may escape from the guide pulley during reverse rotation of the multistage sprocket assembly caused by reverse pedalling.

This invention is characterized in that a rear derailleur including a chain guide comprising a guide pulley, a tension pulley and pulley plates for both the pulleys, is provided with a holder at the pulley plate positioned at the multistage sprocket assembly side and outsdie the path of movement of the chain travelling from the tension pulley to the guide pulley, the holder holding chain line of the chain, which is driven from the multistage sprocket assembly to the guide pulley by reverse rotation of the bicycle wheel, such that the chain does not shift from the aforesaid path.

Hence, in a case where the chain guide is switched to the high speed stage and the wheel is reversely rotated in condition of changing the bicycle speed to the low speed stage, the chain driven from the low speed sprocket to the guide pulley, even when slackened to curve outwardly from the guide pulley and intended to disengage therefrom, is held by the holder. Hence, under such condition, when the bicycle moves forward or is driven by normal pedalling, the chain surely engages with the guide pulley and is prevented from falling down between the guide pulley and the pulley plate.

The invention is further characterized in that at the pulley plate at the derailleur body side and at the exit portion through which the chain in engagement with the guide pulley goes out, a restraint portion is provided which restrains the chain from escaping from the pulley plate when driven from the multistage sprocket assembly to the guide pulley, thereby enabling the chain to travel in reverse without risk of its escaping from the pulley plate.

Accordingly, in a case where the operating lever is preset to the low speed stage during the engagement of the chain with the high speed sprocket, even when the pedals are reversely operated or the bicycle is backwardly moved, the chain is restricted from a shift in its contact position with the pulley plate at the exit portion for the chain and restrained from being raised forwardly in the direction of reverse rotation of the high speed sprocket, thereby enabling the chain to be moved toward the tension pulley without leaving the pulley plate and thus solving the problem of a breakdown in the derailleur.

This invention is still further characterized in that on the pulley plate of the chain guide at the multistage sprocket assembly side and at the exit portion for the chain travelling from the guide pulley to the multistage sprocket assembly, a guide is provided which has a circular-arc guide face for engaging with the chain when reversely driven from the multistage sprocket assembly to the guide pulley and for guiding the chain toward the tension pulley, and the guide face at the entrace for the reversely driven chain is made smaller in an outer diameter than the guide pulley to thereby form a relay portion.

Hence, in such construction, even when the chain guide is set to the high speed sprocket side in condition of engaging the chain with the low speed sprocket and the pedals are reversely operated, the chain, which is to be reversely and slantwise driven from the low speed sprocket at the entrance portion of the guide pulley, is guided properly by the guide face having the relay portion toward the tension pulley without being locked.

These and other objects of the invention will become more apparent in the detailed description and examples which follow.

DETAILED DESCRIPTION OF THE INVENTION

Figure 1:
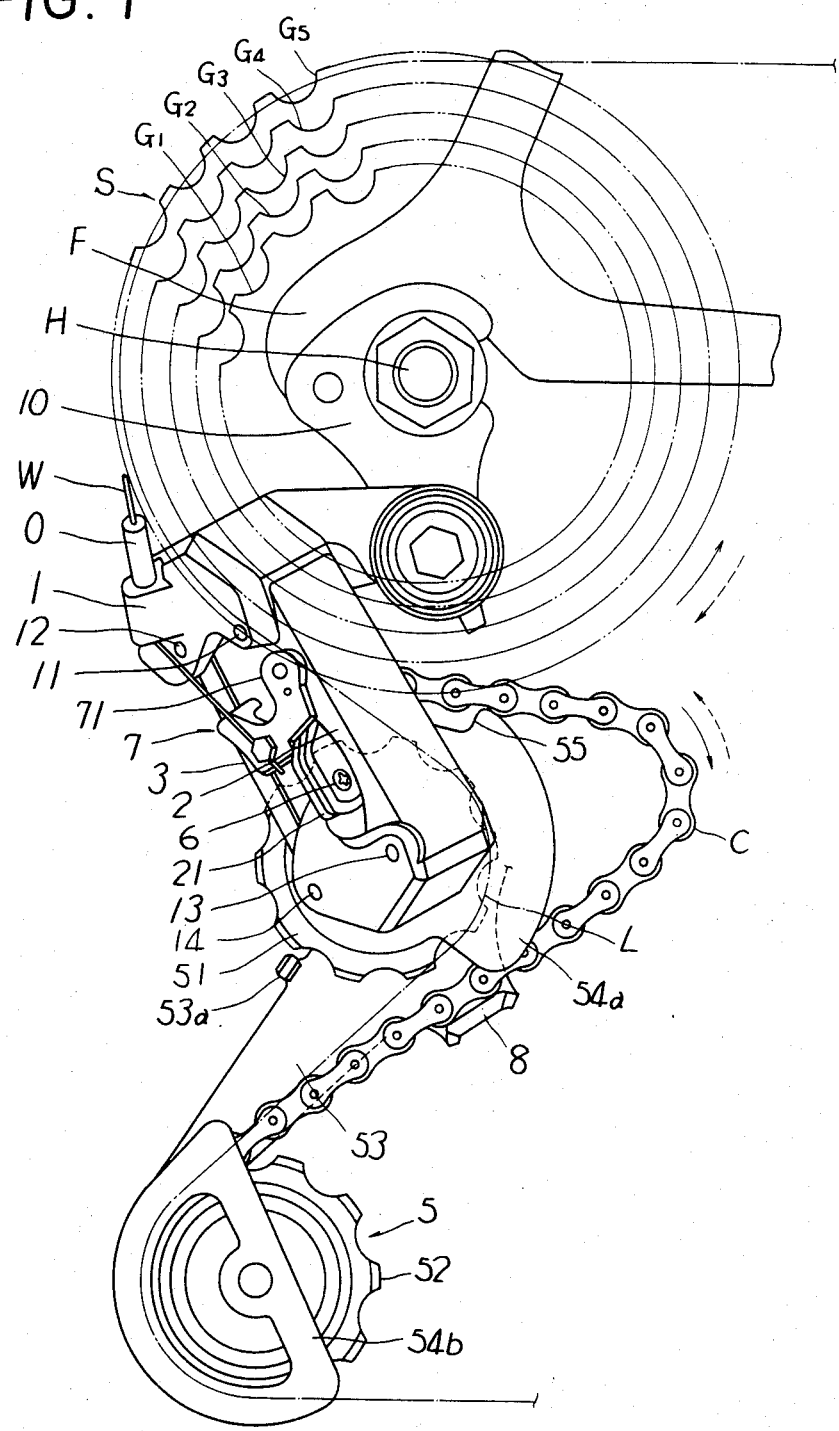
FIG. 1 is a front view of a first embodiment of a rear derailleur of the invention, in condition of being mounted to the bicycle.

Referring to FIG. 1, a first embodiment of a rear derailleur of the invention is shown, which basically comprises a derailleur body of a linkage mechanism comprising a base member 1, a pair of linkage members 2 and 3, and a movable member 4. A chain guide 5 is mounted to the movable member 4 for guiding a driving chain C to each sprocket $G_1$, $G_2$, $G_3$, $G_4$ or $G_5$ in the order of increasing diameter at a multistage sprocket assembly S, the movable member 4 moving with respect to the base member 1 to switch the chain C to a desired one of the sprockets.

The base member 1 in the first embodiment is mounted through a fixing member 10 to a back fork F supporting the rear wheel hub H and is swingable longitudinally of the bicycle, and the linkage members 2 and 3 are pivoted to the base member 1 through a pair of pins 11 and 12. Movable member 4 is supported to the free ends of linkage members 2 and 3 through a pair of pins 13 and 14 in relation of being swingable within a predetermined range in the direction of arranging the sprockets $G_1$ through $G_5$.

The chain guide 5 comprises a guide pulley 51 and a tension pulley 52 below the sprocket assembly S, an inner plate 53 at a side of multistage sprocket assembly S, and outer plates 54a and 54b opposite to the inner plate 53. Chain guide 5 is pivoted swingably to the movable member 4. A tension spring ( not shown ) for stretching the chain C between both the pulleys 51 and 52 is provided between the chain guide 5 and the movable member 4, and a return spring ( not shown ) is provided between the linkage member 2 or 3 and the movable member 4, thereby biasing the chain guide 5 toward the high speed sprocket side.

One linkage member 2 forms at a lengthwise intermediate portion of the lower side surface a projection 21 projecting downwardly and outwardly, with the projection 21 providing an adjusting means 6 which biases the movable member 4 to swing against a biasing force of the return spring to thereby set both the pulleys in positions corresponding to the smallest diameter sprocket $G_1$.

Reference numeral 7 is an energy conservation mechanism comprising a saver arm 71 for energy conservation. Saver arm 71 is pivoted to the linkage member 2. Arm 71 fixes a control wire W, and the base member 1 fixes an outer sheath O so that the control wire W is operated to switch the driving chain C by the chain guide 5 through the energy conservation mechanism 7.

In the first embodiment, on the inner plate 53 and outside the path L of movement of the chain travelling from the tension pulley 52 to the guide pulley 51, a holder 8 is provided which holds along the path L the chain line of the chain driven from the multistage sprocket assembly to the guide pulley 51 and intended to leave the path L when travelling from the multistage sprocket assembly S to the guide pulley 51 due to reverse rotation of the bicycle wheel.

Figure 2:
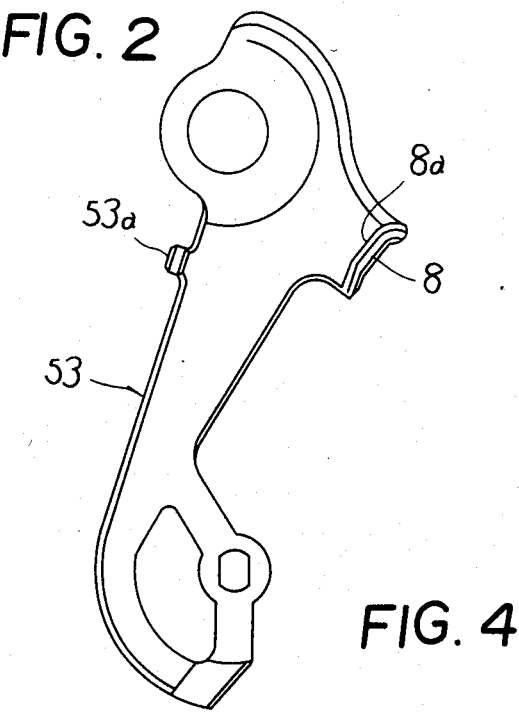
FIG. 2 is a front view of an inner plate of a chain guide positioned at the multistage sprocket assembly side.
Figure 3:
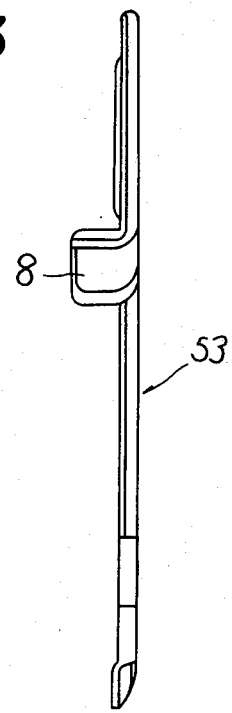
FIG. 3 is a side view of the inner plate.

The inner plate 53 in the first embodiment, as shown in FIGS. 2 and 3, is formed of one sheet of metallic material and the outer plates 54a and 54b are separate from each other, the inner plate 53 being bent at the portion outside the path L of chain movement and toward the outer plate 54a so as to form the holder 8 integral with the inner plate 53.

Now, in the state where the chain guide 5, as shown in FIG. 1, is put in the chain switching position corresponding to the largest diameter sprocket $G_5$ and the chain C engages therewith in the lowest speed-change stage, when the operating lever is switched to the high speed change stage, the chain guide 5 becomes energized by the return spring in the direction of switching the chain to the high speed sprocket. Under this condition, when reverse rotation of the wheel allows the multistage sprocket assembly S to rotate in a reverse direction as shown by the solid arrow in FIG. 1, the chain C is driven in reverse as shown by the solid arrow in FIG. 1 and slackens to curve rightwardly outwardly of guide pulley 51 as shown. The holder 8 is disposed mainly between the guide pulley 51 and the tension pulley 52 and provides, as shown in FIG. 2, a chain contact face 8a swollen in a circular arc with respect to the path of chain movement from the guide pulley 51 to the tension pulley 52 when the multistage sprocket assembly S rotates in reverse, the circular-arc contact face 8a minimizing contact resistance against the chain C, thereby further effectively restraining the chain from being slackened to curve outwardly.

The chain C is held between the inner plate 53 and the outer plate 54a by means of the holder 8 so that the outwardly curved portion of chain C can be held corresponding to the proper chain line between both the pulleys 51 and 52. Hence, when the normal rotation of the bicycle wheel allows each sprocket to rotate as shown by the dotted arrow in FIG. 1 and the chain C is driven in the direction of the dotted arrow in FIG. 1, there is no fear that the chain C will fall down between the guide pulley 51 and the inner plate 53.

The holder 8 is provided, so that when the wheel rotates in reverse, the chain C is smoothly driven from the maximum tooth number low speed sprocket $G_5$ to the tension pulley 52 via the guide pulley 51. Hence, the chain C is restrained to that extent from being slack to curve outwardly and is surely held in the position corresponding to the proper chain line of the chain when normally driven.

In addition, in FIG. 1, reference numeral 53a designates a stopper by which the clockwise rotation of chain guide 5 by the tension spring is stopped with respect to the movable member 4.

In the aforesaid construction, the holder 8 is not limited to being formed at the position as shown in the illustrated embodiment, but in accordance with the present invention may be selected in any desired position where the chain line of chain C intended to leave the path L can be held proper between both pulleys 51 and 52 and along the aforesaid path L.

Figure 4:
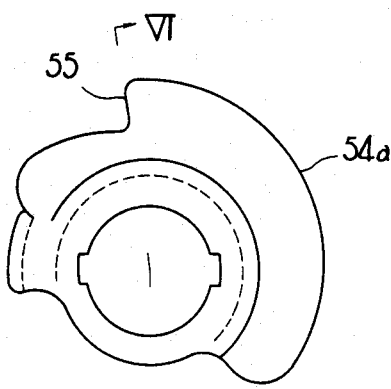
FIG. 4 is a front view of an outer plate only at the chain guide.
Figure 5:
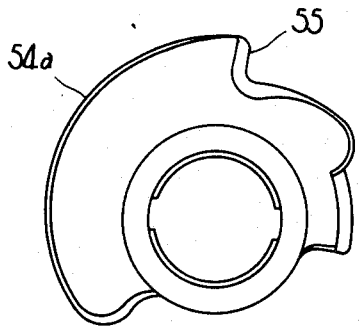
FIG. 5 is a rear view of the outer plate.
Figure 7:
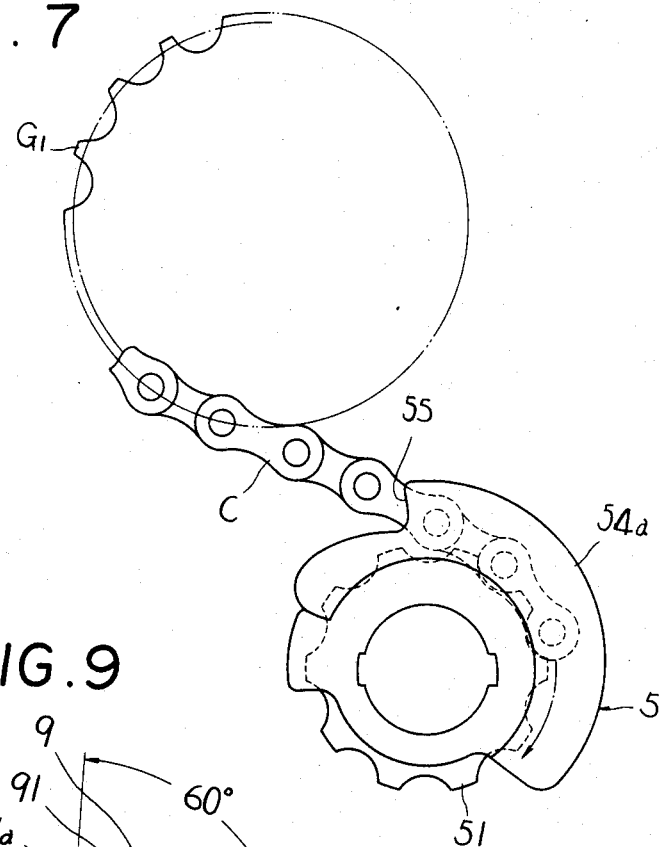
FIG. 7 is an illustration of a relation between a restraint means and the chain.

It is preferable for the first embodiment to provide, as shown in FIGS. 1, 4 and 5, a restraint means 55 on the outer plate 54a and at the exit portion for the chain C when normally, i.e., forwardly driven in other words, at the entrance portion for the chain when driven in reverse. Restraint means 55 restrains the chain C from escaping from the outer plate 54a when the multistage sprocket assembly S rotates in reverse to reversely drive the chain C.

The restraint means 55, as shown in FIGS. 4 and 5, is formed, for example, by cutting the edge at the exit portion for chain C when normally driven. The chain C inclined between the minimum tooth number high speed sprocket $G_1$ and the guide pulley 51 shifted toward the low speed sprocket $G_5$, may contact with the outer plate 54a, but the restraint means 55 at the outer plate 54a allows the chain C to move smoothly toward the tension pulley 52 without hindrance of contact with the outer plate 54a. Hence, the chain C is restricted to minimum outward curving as shown in FIG. 1 and also from escaping from the outer plate 54a.

Figure 6:
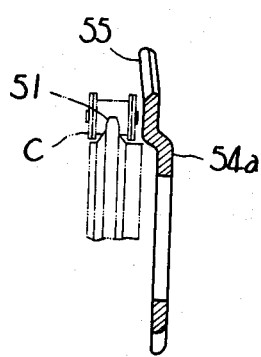
FIG. 6 is a sectional view taken on the line VI—VI in FIG. 4.

Also, the restraint means 55, as shown in FIG. 6, is preferred to be slanted slightly toward the inner plate 53 so that the chain C is restrained from escaping from the outer plate 54a.

The provision of restraint means 55 at the outer plate 54a is effective in that the chain guide 5 is preshifted in the position corresponding to the low speed sprocket $G_5$ and the bicycle is moved backwardly in condition of positioning the chain guide 5 corresponding to the minimum tooth number high speed sprocket $G_1$ and of engaging the chain C therewith. In other words, when the control wire W is pulled to actuate the energy conservation mechanism 7 in condition of engaging the chain C with the minimum tooth number high speed sprocket $G_1$, the chain guide 5 is intended to move toward the maximum tooth number low speed sprocket $G_5$, while the chain C is intended to remain at the high speed sprocket $G_1$. Hence, the chain C largely inclines from the sprocket $G_1$ to the guide pulley 51 and contacts at its inclined portion with the outer plate 54a. Under this condition, when the bicycle moves backwardly to reversely rotate the multistage sprocket assembly S, the chain C is reversely driven from the high speed sprocket $G_1$ to the guide pulley 51 while the inclined portion is in contact with the outer plate 54a, at which time, if the restraint means 55 is not proivded, the chain C contacts with the exit portion therefor at the outer plate 54a and leads to a rise ahead in the direction of reverse rotation of the minimum tooth number high speed sprocket $G_1$. The restraint means 55, however, allows the chain C to travel smoothly toward the tension pulley 52, thereby enabling the chain C to be restrained from escaping from the outer plate 54a.

Figure 9:
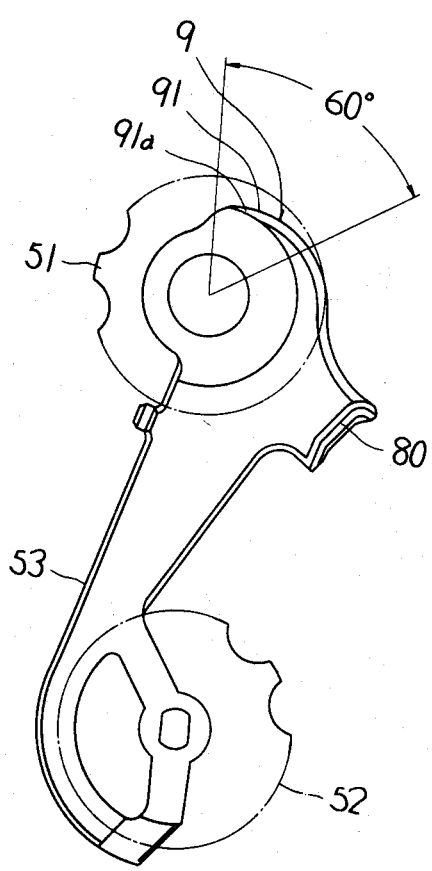
FIG. 9 is a front view of an inner plate at the chain guide in the second embodiment.
Figure 10:
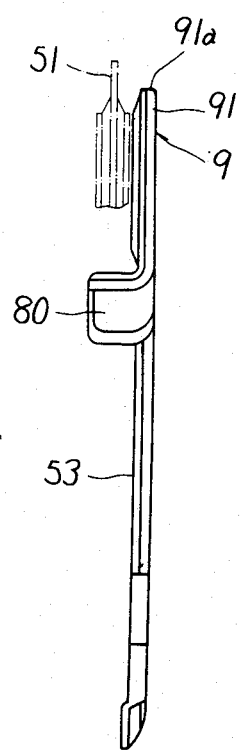
FIG. 10 is a side view of the inner plate in FIG. 9.
Figure 8:
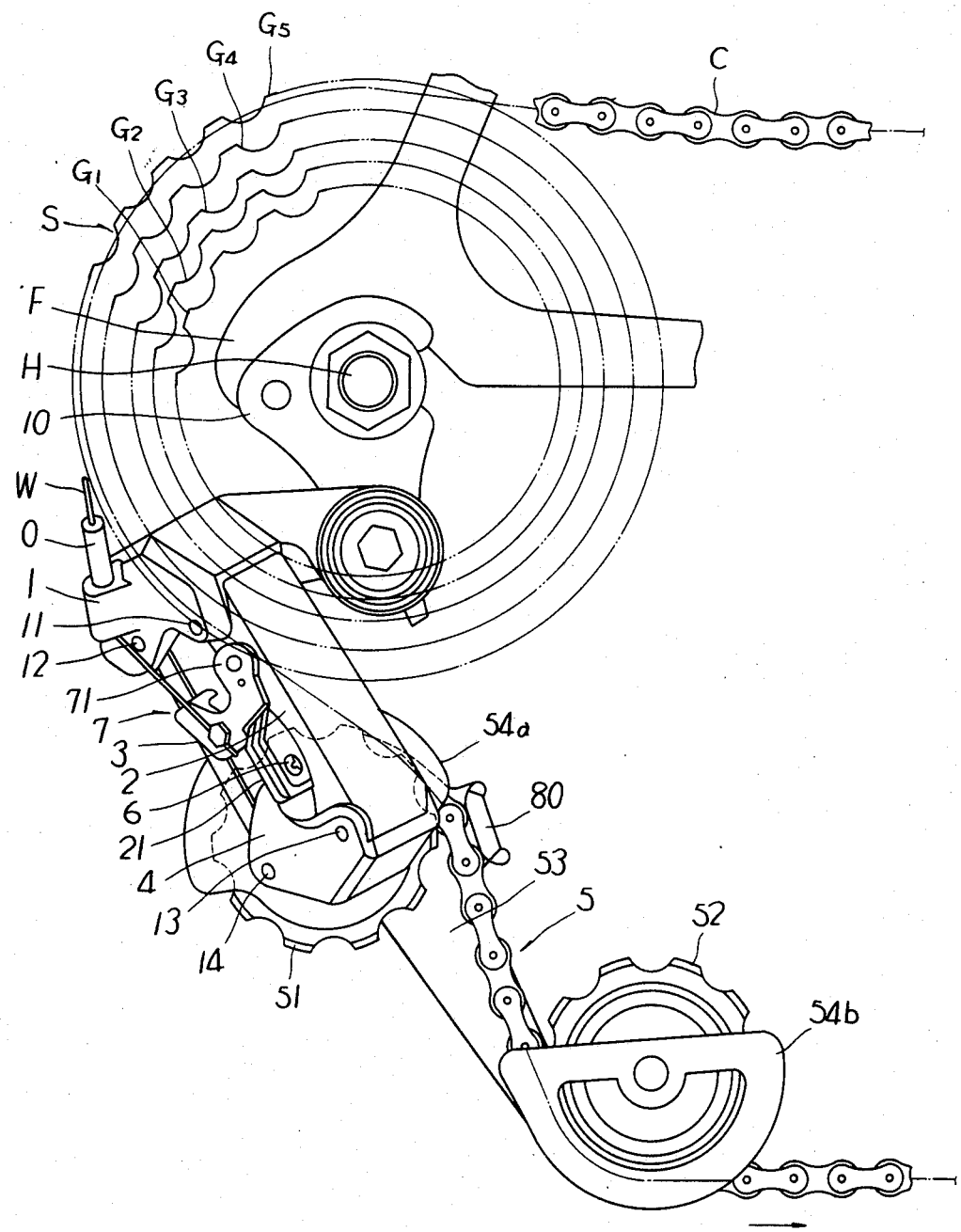
FIG. 8 is a front view of a second embodiment of the invention, corresponding to FIG. 1.

Referring to FIGS. 8 through 10, a second embodiment of the rear derailleur of the invention is illustrated in which inner plate 53 includes a holder 80 the same as in the first embodiment described above. A guide 9 is provided on inner plate 53 at the exit portion for the chain C driven from the guide pulley 51 to the multistage sprocket assembly S. Guide 9 has a guide face 91 which is formed in a circular arc and which engages with the chain C to guide it toward the tension pulley 52 when the chain C is driven by reverse pedalling from the multistage sprocket assembly S to the guide pulley 51.

The guide face 91, as shown in FIG. 9, is provided with an entrance portion 91a smaller in an outer diameter than the guide pulley 51, the entrance portion 91a gradually increasing in diameter forwardly in the direction of reverse movement of chain C.

Incidentally, when the guide pulley 51 is 19 mm in radius, the edge of entrance portion 91a for the reversely driven chain C is 15 mm in radius, and the radius of guide face 91 apart from the entrance portion edge at an angle of 74° is 20.5 mm and that of guide face 91a apart from the entrance edge at an angle of 60° is equal to that of guide pulley 51.

Now, in the above construction, when the chain guide 5 is switched to the top speed stage in condition of engaging the chain C with the low speed sprocket G5 and the pedals are reversely operated, the chain C is driven in the direction of the solid arrow as shown in FIG. 8, whereby the chain guide 5 is actuated counterclockwise. Also, since the chain guide 5 is intended to move toward the high speed sprocket G1, the chain C is driven slantwise from the sprocket G5 to the guide pulley 51, at which time the chain C travels while in contact with the inner plate 53, so that unless the guide 9 is provided, the chain C would be locked between the guide pulley 51 and the inner plate 53 so as to be hindered from movement toward the tension pulley 52. The guide 9, however, is provided to allow the chain C to ride on the entrance portion 91a at the guide 9 to engage with the guide face 91 thereof and then to be guided toward the tension pulley 52, whereby the chain C is guided smoothly thereto without being locked by the inner plate 53 in contact therewith, thereby enabling the reverse movement of chain C by the reverse pedalling.

Although several embodiments have been described, they are merely exemplary of the invention and not to be construed as limiting, the invention being defined solely by the appended claims.

What is claimed is:

1. A rear derailleur for a bicycle for selectively switching a driving chain from one sprocket to another of a multi-stage sprocket assembly to change the bicycle speed, said derailleur comprising:
a chain guide comprising a guide pulley, a tension pulley and pulley plates, said pulley plates comprising an inner plate and outer plates, said pulley plates rotatably supporting said guide pulley and said tension pulley, said pulley plates for guiding said chain to a selected sprocket to which said chain is to be switched, one said outer plate being located outwardly of the multi-stage sprocket assembly and comprising a restraint means projecting radially outwardly relative to an outer peripheral edge of an entrance portion of said one outer plate through which said chain passes when moving in reverse, said restraint means for restraining said chain from being raised from said outer peripheral edge of said one outer plate to allow said chain to move smoothly toward said guide pulley.

2. A rear derailleur according to claim 1, wherein said one outer plate is slanted toward a predetermined movement path of said chain.

3. A rear derailleur according to claim 1, wherein said inner plate is positioned at a side of said pulley which is closest to said multi-stage sprocket assembly and includes a holder positioned outside a path of movement of said chain from said tension pulley to said guide pulley when said multi-stage sprocket assembly rotates forwardly, said holder for preventing said chain from deviating from said path by an amount greater than a predetermined amount when said chain travels to said guide pulley from a sprocket of said multi-stage sprocket assembly due to reverse rotation.

4. A rear derailleur for a bicycle according to claim 3, wherein said holder is disposed between said guide pulley and said tension pulley and has a chain contact surface having a substantially circular-arc shape with its convex side projecting toward the path of movement of said chain travelling from said guide pulley to said tension pulley when said multistage sprocket assembly rotates in reverse.

5. A rear derailleur for a bicycle according to claim 3, wherein said inner plate includes a guide portion disposed at an exit portion of said inner plate through which said chain passes during forward rotation thereof, said guide portion having a substantially circular-arc shaped guide face for engaging and guiding said chain toward said tension pulley during reverse rotation of said multistage sprocket assembly.

6. A rear derailleur for a bicycle according to claim 5, wherein said guide portion includes an entrance portion for reverse movement of said chain which is smaller in an outer diameter than an outer diameter of said guide pulley.

* * * * *